United States Patent
Shoup

(10) Patent No.: US 8,418,432 B2
(45) Date of Patent: Apr. 16, 2013

(54) QUICK CONNECT/DISCONNECT COUPLING FOR A STALK STOMPER

(76) Inventor: Kenneth E. Shoup, Kankakee, IL (US)

( * ) Notice: Subject to any disclaimer, the term of this patent is extended or adjusted under 35 U.S.C. 154(b) by 35 days.

(21) Appl. No.: 13/135,944

(22) Filed: Jul. 19, 2011

(65) Prior Publication Data

US 2013/0020101 A1    Jan. 24, 2013

(51) Int. Cl.
*A01D 41/14* (2006.01)
(52) U.S. Cl.
USPC ........................................ 56/10.2 E
(58) Field of Classification Search ................ 56/1, 119, 56/15.8, 17.4, 105, 106, 193, DIG. 3, DIG. 9, 56/10.2 E; 403/318, 319, 322.2; 414/723
See application file for complete search history.

(56) References Cited

U.S. PATENT DOCUMENTS

| | | | |
|---|---|---|---|
| 3,982,384 A * | 9/1976 | Rohweder et al. | 56/106 |
| 4,149,361 A * | 4/1979 | Pauletti et al. | 56/105 |
| 4,890,974 A * | 1/1990 | Kistner | 414/723 |
| 5,634,736 A * | 6/1997 | Brown et al. | 403/322.4 |
| 5,685,689 A * | 11/1997 | Schneider et al. | 414/723 |
| 5,890,871 A * | 4/1999 | Woerman | 414/723 |
| 5,915,837 A * | 6/1999 | Brown et al. | 37/468 |
| 7,814,737 B2 | 10/2010 | Pierson | |
| 2002/0112461 A1 | 8/2002 | Burk | |

OTHER PUBLICATIONS

Jul. 13, 2010 online search—Lankota Group, Inc.—Product Details; http://www.lankota.com/product_details.aspx? LanID-227; Corn Head Stalk Stompers—Shoe Kit; copyright 1998.

Dec. 10, 2010 online search—Planter Pro—AgFocus Official Site—Home; http://www.agfocus.com/; Planter Pro The Direct Planting System; copyright 2010.
Aug. 13, 2010 online search—Lankota Stalk Stomper Farm and Ranch Guide: New Products; http://www.farmandranchguide.com/articles/2009/06/09/new_products/new24.txt; Lankota Stalk Stomper; copyright 2010.
Jun. 21, 2011 online search—Stalk Stompers products, buy Stalk Stompers products from alibaba.com; http://www.alibaba.com/product-free/265616365/Stalk_Stompers.html; Stalk Stompers; copyright 1999-2010.

(Continued)

*Primary Examiner* — Alicia Torres
(74) *Attorney, Agent, or Firm* — Olson & Cepuritis, Ltd.

(57) ABSTRACT

A quick connect/disconnect coupling for securing an agricultural implement, such as a stalk stomper, to a tool bar assembly on a tractor, without the need for any tools. The tool bar assembly includes a bracket having a pair of spaced-apart arm members. Each arm member has a recess therein, and a hole spaced therefrom. The recesses and the holes are generally transversely aligned. A pin is adapted to be received in the holes. The agricultural implement includes a plate member. Provided on the plate member are a cross bar and a retention stop. The cross bar is adapted to be engaged in the recesses. To connect the agricultural implement to the tool bar assembly, the cross bar is engaged in the recesses and the agricultural implement is pivoted so that the plate member is above the pair of holes and the pin can be inserted into the transversely aligned holes to connect the agricultural implement to the tool bar assembly. The pin engages the retention stop so as to prevent longitudinal movement of the stalk stomper with respect to the tool bar assembly in operation and thereby prevent the cross bar from disengaging from the recesses. To disconnect the agricultural implement from the tool bar assembly, the pin is removed from the transversely aligned holes and the cross bar is disengaged from the recesses.

2 Claims, 3 Drawing Sheets

OTHER PUBLICATIONS

Jun. 21, 2011 online search—May Wes Stalk Stompers for tractor tire stubble damage protection; http://www.maywes.com/stalk_stompers_tractors; Protect Tractor Tracks and Tires From Stubble Damage With May Wes Tractor Stalk Stompers.

Jul. 13, 2010 online search—May Wes Stalk Stomper for Stubble Damage Protection; http://www.maywes.com/stalk_stompers_combines; Stubble Damage Protection. May Wes Stalk Stomper. Level Corn Stalks Ahead of Combine Tires/Tracks.

* cited by examiner

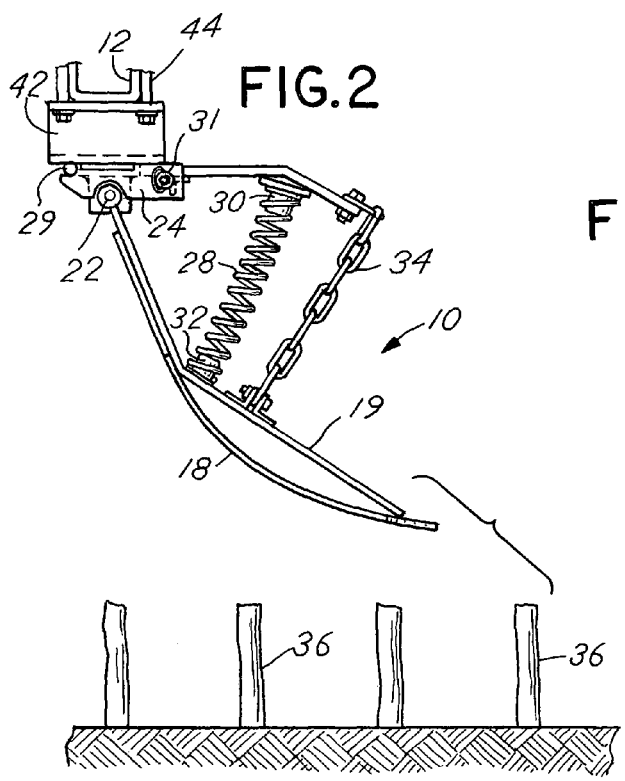
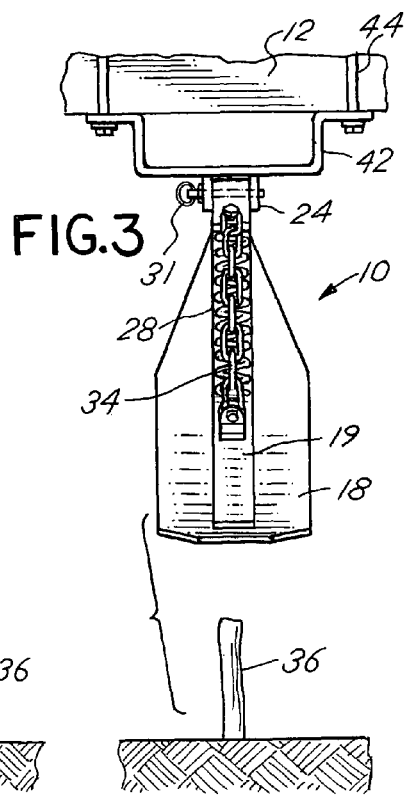
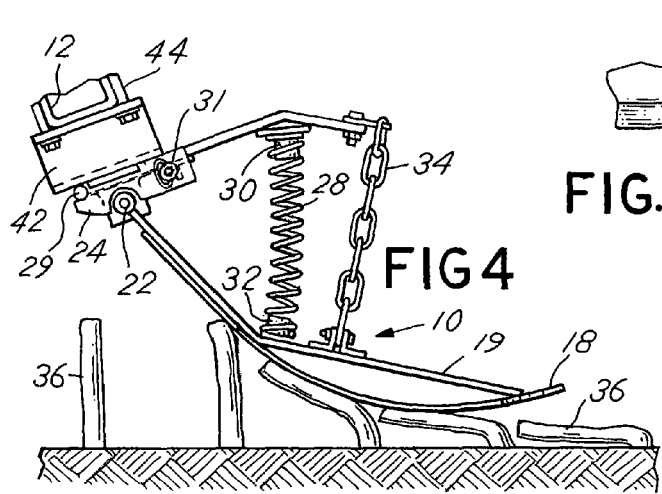
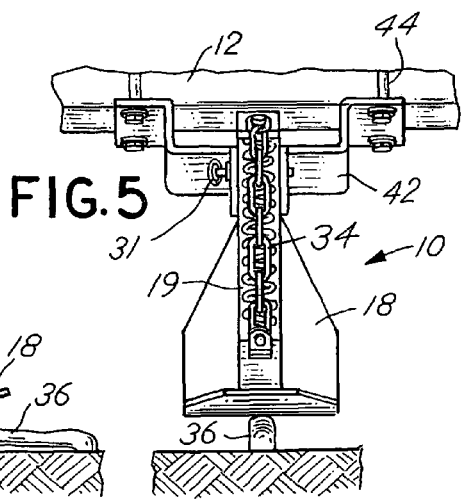

QUICK CONNECT/DISCONNECT COUPLING FOR A STALK STOMPER

FIELD OF THE INVENTION

The present invention pertains to a quick connect/disconnect apparatus for securing a farm implement to a tractor or combine and, more particularly, to a quick connect/disconnect apparatus for securing a stalk stomper to a tool bar assembly on the corn head of a combine.

BACKGROUND OF THE INVENTION

Stalk stompers are used to protect the tires of combines and tractors against damage from corn stalks, bean stubble, and the like, while working in the field. The stalk stomper is generally formed from a skid shoe or plate that is adapted to force the stubble to the ground before it has an opportunity to puncture the tire of the tractor or combine when harvesting crops such as corn and soy beans. The skid shoe is secured to a bracket that is in turn affixed to the tool bar of the tractor or combine by a rigid connection that usually includes nut and bolt fasteners. This requires the use of a wrench or like tool. A spring is positioned between an angle plate member or upper plate member and the skid shoe to apply a downward pressure to the skid shoe to force it toward the ground in use. A chain connected between the skid shoe and the angle plate member maintains the spring in assembled position when the tool bar assembly is raised to raise the skid shoe from operating position against the stubble on the ground.

There is a need for a connection that will enable the stalk stomper to be easily affixed to a tool bar assembly without the need for tools. Thus, an object of the present invention is to provide a quick connect/disconnect apparatus for securing a stalk stomper or like implement to a tool bar assembly on a tractor or combine without the need for tools.

Another object of the present invention is to provide a quick connect/disconnect coupling for securing a stalk stomper or like implement to a tool bar assembly that has a pair of transversely spaced-apart bracket arms containing a recess in each bracket arm and a hole in each bracket arm, the recesses and the holes being aligned transversely, with a transverse bar affixed to an angle plate member on the stalk stomper, a retention stop on the angle plate member, and a pin adapted to extend through the transversely aligned holes, whereby, to secure the stalk stomper to the tool bar assembly, the transverse bar is engaged in the recesses and the angle plate member on the stalk stomper is positioned above the holes in the bracket arms and the pin is inserted into the holes to retain the angle plate member between the pin and the tool bar assembly and prevent the transverse bar from moving longitudinally in operation and disengaging from the recesses.

A further object of the present invention is to provide a quick connect/disconnect coupling for securing a stalk stomper or like implement to a tool bar assembly that has a pair of. transversely spaced-apart bracket arms containing a recess in each bracket arm and a hole in each bracket arm, the recesses and the holes being aligned transversely, with a transverse bar affixed to an angle plate member on the stalk stomper, a retention stop on the angle plate member and a pin adapted to extend through the transversely aligned holes, whereby, to secure the stalk stomper to the tool bar assembly, the transverse bar is engaged in the recesses and the angle plate member on the stalk stomper is positioned above the holes in the bracket arms and the pin is inserted into the holes to retain the angle plate member between the pin and the tool bar assembly and to engage the retention stop to prevent the transverse bar from moving longitudinally in operation and disengaging from the recesses.

Other objects and advantages of the present invention will be made more apparent hereinafter.

SUMMARY OF THE INVENTION

There has been provided by the present invention a quick connect/disconnect coupling for securing an agricultural implement to a tool bar assembly. The tool bar assembly includes a bracket having a pair of spaced-apart arm members. Each arm member has a recess therein. The recesses are generally transversely aligned. A pair of holes are provided in the bracket spaced longitudinally from the recesses. The pair of holes are generally transversely aligned. A pin is adapted to be received in the holes. The implement includes a plate member having thereon a transverse bar or cross bar adapted to be received in the recesses and a retention stop. To connect the agricultural implement to the tool bar assembly, the cross bar is engaged in the recesses and the agricultural implement is pivoted so that the plate member is above the pair of holes and the pin can be inserted into the transversely aligned holes to connect the agricultural implement to the tool bar assembly. The pin will engage the retention stop to prevent the transverse bar from disengaging from the recesses in use. To disconnect the agricultural implement from the tool bar assembly, manually remove the pin from the transversely aligned holes and disengage the transverse bar from the recesses. The assembly/disassembly of the agricultural implement from the tool bar assembly is quick and easy and can be done manually without the need for any tools.

The use of the novel quick connect/disconnect coupling of the present invention for connecting a stalk stomper to a tool bar assembly is especially advantageous. The stalk stomper is provided with plate member having a cross bar adapted to be received in the recesses in the depending arm members on the tool bar assembly. Retention means in the form of a retention stop are provided on the plate member. To connect the stalk stomper to the tool bar assembly, the cross bar is engaged in the recesses and the stalk stomper is pivoted so that the plate member is above the pair of holes and the pin can be inserted into the transversely aligned holes to connect the stalk stomper to the tool bar assembly. The pin will abut the retention stop to prevent the transverse bar from disengaging from the recesses in use. To disconnect the stalk stomper from the tool bar assembly, the pin is removed from the transversely aligned holes and the cross bar is disengaged from the recesses in the depending arm members. The assembly/disassembly of the stalk stomper from the tool bar assembly is quick and easy and can be done manually without the need for any tools.

BRIEF DESCRIPTION OF THE DRAWINGS

There is shown in the drawing a presently preferred embodiment of the present invention, wherein like numerals in the various views refer to like elements, and wherein:

FIG. 2 is a side view of a stalk stomper in elevated position with respect to stubble on the ground;

FIG. 3 is a rear view of a stalk stomper in elevated position with respect to stubble on the ground;

FIG. 4 is a side view of a stalk stomper in lowered position engaging and forcing stubble to the ground;

FIG. 5 is a rear view of a stalk stomper in lowered position engaging and forcing stubble to the ground.

DETAILED DESCRIPTION OF THE INVENTION

Figure 1:
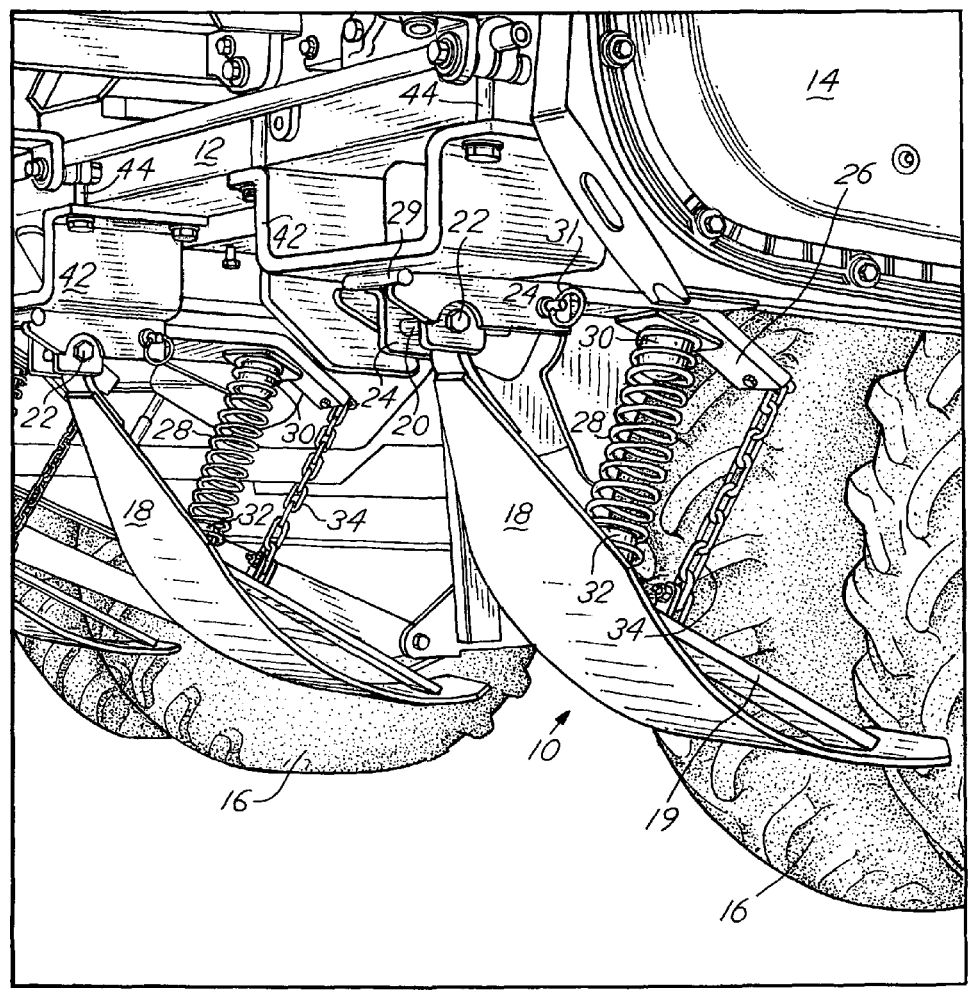
FIG. 1 is a rear perspective view of a tractor showing a pair of stalk stompers affixed to a tool bar by means of the quick connect/disconnect apparatus of the present invention.

There is shown in FIG. 1 of the drawing a presently preferred embodiment of the present invention wherein a stalk stomper assembly 10 is secured to a tool bar assembly 12 on a combine corn head 14. The combine corn head 14 includes tires 16 mounted on the combine corn head 14 in conventional manner.

The stalk stomper assembly 10 includes a skid shoe 18 secured to a bracket 19 which has a cylindrical housing 20 at one end. The cylindrical housing 20 has through hole for receiving a pivot pin 22 for connecting an end of the skid shoe bracket 19 to the spaced-apart arms 24 depending or extending downward from bracket 26.

A coil spring 28 is secured between a tubular projection 30 affixed to the angle plate member 26 and a tubular projection 32 affixed to the skid shoe bracket 19. Several coils of the upper end of spring 28 overlap and surround the projection 30 and are engaged thereby. Likewise, several coils of the lower end of the spring 28 overlap and surround the projection 32 and are engaged thereby.

As will be explained more fully hereinafter, a transverse bar or cross bar 29 on the upper plate member 26 will engage recesses in the arm members 24 and a pin 31 will be inserted into aligned holes or openings in the arm members 24 for connecting and retaining the stalk stomper 10 on the tool bar assembly 12. The pin 31 will engage retention means on the plate member 26 for preventing the cross bar from disengaging from the recesses in use. The width of the upper plate member or angle plate member 26 is less than the spacing of the arm members 24 so that the angle plate member 26 will fit between the arm members 24 in assembled relationship.

Figure 6:
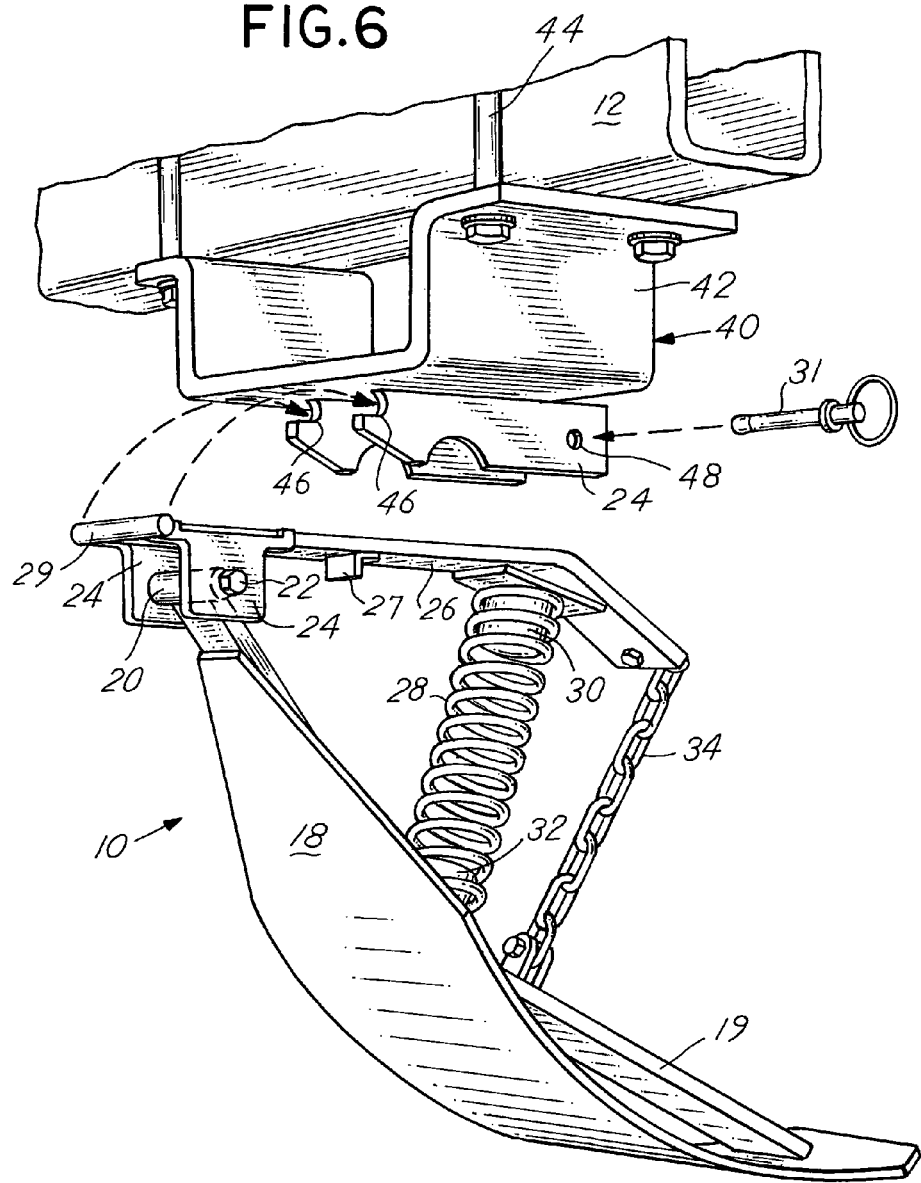
FIG. 6 is an exploded perspective view illustrating the novel quick connect/disconnect connection of a stalk stomper to a tool bar.

Rearwardly of the spring 28 as seen in FIGS. 1 and 6 for example, there is a chain 34 connected between the angle plate member 26 and the skid shoe bracket 19 for limiting the expansion of the spring 28 and maintaining the spring 28 in place on the tubular projections 30 and 32.

As seen in FIGS. 1, 2 and 3, the stalk stomper assembly 10 is in the raised position away from the stubble on the ground, indicated generally by the number 36. The spring 30 is urging the skid shoe 18 downwardly about the pivot pin 22 that connects the front end of the bracket 19 to the depending arms 24 on the tool bar assembly 12. The chain 34 retains the spring 30 in assembled relationship with the projections 30 and 32 when the stalk stomper 10 is in inoperative position away from the ground.

In FIGS. 4 and 5 there is shown the stalk stomper assembly 10 in the operative position engaging and pressing down upon the stubble 36 so as to prevent damage to the tires 16 of the tractor or combine 14. The stubble 36 tends to pivot the skid shoe 18 counterclockwise as seen in FIGS. 4 and 5 and the spring 30 is compressed to effectively provide a force operating in the opposite direction to push the skid shoe 18 against the stubble 36 to flatten the stubble and prevent tire damage.

With reference to FIG. 6, it is seen that the tool bar assembly 12 includes a tool bar 40 and bracket means 42 secured thereto by suitable fastening means 44, for example, U-bolt and nut fasteners. The spaced-apart arms 24 may be integrally formed with the bracket 42 or suitably connected thereto by welding or other fastening means. As shown, the recesses 46 are formed in the arm members 24 in front of the holes 48. The recesses 46 are transversely aligned and the holes 48 are transversely aligned. Provided on the angle plate member 26 are retention means 27, which may be a retention block or retention stop. A pin 50 is adapted to be inserted into the aligned holes 48 when the stalk stomper 10 is properly positioned with the cross bar 29 in the recesses 46. The thickness of the plate member 26 is less than the spacing between the top of the holes 48 and the bottom of bracket 42 so that with the pin 31 in the holes 48, the plate member 26 will be secured between the bracket 42 and the pin 31. Further, the rear of the pin 31 will engage the retention block 27 to preclude longitudinal movement of the stalk stomper 10 with respect to the depending arms 24 to prevent the cross bar or transverse bar 29 from disengaging from the recesses 46 in operation.

In summary, to connect the stalk stomper 10 to the tool bar assembly 12, the cross bar 29 is engaged in the recesses 46 and the stalk stomper 10 is pivoted so that the angle plate member 26 of the stalk stomper 10 is above the top of the pair of holes 48 and the pin 31 can be inserted into the transversely aligned holes 48 to connect the stalk stomper 10 to the tool bar assembly 12. The pin 31 will engage the retention stop 27 to preclude longitudinal movement of the stalk stomper 10 with respect to the depending arms 24 to prevent the cross bar or transverse bar 29 from disengaging from the recesses 46 in use. The stalk stomper 10 can be disconnected from the tool bar assembly 12 by removing the pin 31 from the transversely aligned holes 48 and removing the cross bar 29 from engagement with the recesses 46 in the depending arms 24. The connect and disconnect of the stalk stomper from the tool bar assembly 12 are accomplished quickly and easily without the necessity for tools.

It will be apparent that the lateral spacing of the skid shoes 18 (FIG. 1) can be adjusted by loosening a fastening means 44 and sliding the associated bracket 42 on the tool bar 12 the desired distance from an adjacent bracket 42 affixed to the tool bar 12. Fastening means 44 can then be tightened in order to secure the associated bracket 42 in position to fix the desired width between adjacent skid shoes 18.

Further, persons skilled in the art will recognize that the upper plate member may be an angle member or a planar member, depending upon application.

While the recesses 46 have been shown in front of the holes 48 in relation to the movement of the tractor, it will be understood that this arrangement can be reversed without departing from the present invention. For example, the holes 48 could be in front of the recesses 46. In such case the stalk stomper could be readily modified to position the cross bar on the plate member spaced from the front thereof, rather than at the front thereof, as shown, for example, in FIG. 6, and the function of such modified device would essentially be the same as that of the disclosed embodiment.

While a presently preferred embodiment of the present invention has been shown and described, it will be apparent that modifications may be made without departing from the scope of the invention as defined in the attached claims.

The invention claimed is:

1. A quick connect/disconnect coupling for securing a stalk stomper to a tool bar assembly on a combine corn head without the need for tools, the tool bar assembly comprising a bracket having a pair of spaced-apart arm members depending therefrom, each having a recess therein, the recesses being generally transversely aligned, and a pair of holes in the bracket spaced from the recesses, the pair of holes being generally transversely aligned, and a pin adapted to be received in the holes, the stalk stomper being provided with a plate member having a cross bar adapted to be received in the recesses in the depending arm members on the tool bar assembly and a retention means on the plate member, whereby, to connect the stalk stomper to the tool bar assembly, the cross bar is engaged in the recesses and the stalk stomper is pivoted so that the plate member is above the pair of holes and the pin can be inserted into the transversely aligned holes to connect the stalk stomper to the tool bar assembly, the pin engaging the retention means so as to prevent longitudinal movement of the stalk stomper with respect to the tool bar assembly in operation to prevent the cross bar from disengaging from the recesses in use, and to disconnect the stalk stomper from the tool bar assembly, the pin is removed from the transversely aligned holes and the cross bar is removed from engagement with the recesses in the arm members.

2. A quick connect/disconnect coupling as in claim 1, wherein the pair of holes in the bracket are spaced rearwardly from the said recesses.

* * * * *